(12) United States Patent
Herold et al.

(10) Patent No.: US 8,138,637 B2
(45) Date of Patent: Mar. 20, 2012

(54) ELECTRICAL ENERGY TRANSMISSION DEVICE

(75) Inventors: Gerhard Herold, Erlangen (DE); Lutz Kirschner, Herzogenaurach (DE); Hermann Koch, Gerhardshofen (DE); Dietmar Retzmann, Höchstadt (DE)

(73) Assignee: Siemens Aktiengesellschaft, Munich (DE)

( * ) Notice: Subject to any disclaimer, the term of this patent is extended or adjusted under 35 U.S.C. 154(b) by 355 days.

(21) Appl. No.: 12/096,699

(22) PCT Filed: Dec. 7, 2005

(86) PCT No.: PCT/DE2005/002222
§ 371 (c)(1),
(2), (4) Date: Jun. 9, 2008

(87) PCT Pub. No.: WO2007/065383
PCT Pub. Date: Jun. 14, 2007

(65) Prior Publication Data
US 2008/0278121 A1    Nov. 13, 2008

(51) Int. Cl.
*H02G 5/00*    (2006.01)
*G05F 5/00*    (2006.01)
(52) U.S. Cl. .................................. 307/148; 323/209
(58) Field of Classification Search .................. 323/205, 323/207, 209, 210, 211; 174/27, 32, 36; 307/147, 148, 115, 98
See application file for complete search history.

(56) References Cited

U.S. PATENT DOCUMENTS

| | | | | |
|---|---|---|---|---|
| 3,763,461 A * | 10/1973 | Kotski | ............................ | 439/185 |
| 3,795,820 A * | 3/1974 | Eidinger | ....................... | 307/147 |
| 4,999,565 A * | 3/1991 | Nilsson | ......................... | 323/210 |
| 5,032,738 A | 7/1991 | Vithayathil | | |
| 5,367,197 A * | 11/1994 | Klerfors | ........................ | 307/105 |
| 5,548,082 A * | 8/1996 | Palmer | ............................ | 174/34 |
| 5,751,563 A * | 5/1998 | Bjorklund | ....................... | 363/35 |
| 5,777,401 A | 7/1998 | Sjoedin | | |
| 6,154,019 A * | 11/2000 | Valdemarsson et al. | ...... | 323/361 |
| 6,348,778 B1 | 2/2002 | Weinhold et al. | | |
| 6,677,754 B2 * | 1/2004 | Kestler et al. | ................. | 324/322 |
| 6,797,875 B2 * | 9/2004 | Gelloz et al. | ................ | 174/25 R |
| 6,963,187 B2 * | 11/2005 | Bebic et al. | ................... | 323/207 |

(Continued)

FOREIGN PATENT DOCUMENTS

DE    2816361 A1    10/1979

(Continued)

OTHER PUBLICATIONS

Kasztenny et al: "VSI-Based Series Compensation Scheme for Transmission Lines", European Transactions on Electrical Power Engineering, Mar. 1999, pp. 101-108, Verlag, Germany.

(Continued)

*Primary Examiner* — Adolf Berhane
*Assistant Examiner* — Emily Pham
(74) *Attorney, Agent, or Firm* — Laurence A. Greenberg; Werner H. Stemer; Ralph E. Locher

(57) ABSTRACT

An electrical energy transmission device has phase conductors, which carry alternating current and have transfer impedance, and sheathed conductors, which are inductively coupled to the phase conductors. A first end and a second end of each sheathed conductor form a sheath circuit with a reactance. An electronic assembly for changing the impedance of the sheath circuit is provided. The electrical energy transmission device can be used flexibly given different demands placed on the energy transmission. The electronic assembly is also configured to increase the transfer impedance.

19 Claims, 2 Drawing Sheets

U.S. PATENT DOCUMENTS

2008/0093097 A1     4/2008   Schoffner

FOREIGN PATENT DOCUMENTS

| | | |
|---|---|---|
| DE | 19680397 C2 | 8/1998 |
| DE | 19723879 C1 | 8/1998 |
| DE | 19737590 C1 | 10/1998 |
| DE | 19831178 A1 | 1/2000 |
| DE | 19937661 A1 | 2/2001 |
| DE | 19959572 A1 | 6/2001 |
| DE | 19959573 A1 | 6/2001 |
| DE | 102004040247 A1 | 2/2006 |

OTHER PUBLICATIONS

Bulletin SEV/VSE 15/01: "Kompensation von Hochspannungskabeln Durch Induktive Einkopplung", pp. 37-41, Germany. English translation.

Bulletin SEV/VSE 15/01: "Verringerung von Kabelmantelverlusten", pp. 15-18, Germany. English Translation.

Sitnikow et al: "Benefits for Power Electronics for Transmission Enhancement", Russia Power, Mar. 10-11 2004, World Trade Center, pp. 1-20, Moscow, Russia.

ESS: Energy Storage System, Overview on VSC Facts Technologies, p. 1, 2004.

Lehrstuhl fuer Elektrische Energiebersorgung der Universitaet Erlangen-Nuernberg, "Analytische Beschreibung von Stationaer Betriebenen Stromrichtern and Facts-Anlagen im Zustandsraum", pp. 1-7, Germany. English translation.

Kurth et al: "Sufficient Damping of Inter-Area-Oscillations Also Under Deregulated Market Conditions and Power System Enlargement" May 21-22, 2003, pp. 1-5, Germany. English abstract.

\* cited by examiner

ELECTRICAL ENERGY TRANSMISSION DEVICE

BACKGROUND OF THE INVENTION

1. Field of the Invention:

The invention relates to an electrical power transmission device having phase conductors which carry alternating current and have a transmission impedance, and having casing conductors which are inductively coupled to the phase conductors, with a first end and a second end of each casing conductor together with a reactance forming a casing circuit, and with an electronic assembly being provided in order to vary the impedance of the casing circuit.

Cables or gas-insulated lines (GIL) are used for power distribution purposes, in order to transmit large amounts of energy between different grid systems. GILs comprise phase conductors which extend in tubular and gas-insulated casing conductors, and, because of their low transmission impedance, offer the capability to transmit power levels of several thousand megawatts with low losses. However, despite this low transmission impedance, the distribution of high-power currents between grid systems may be adversely affected, for example, when such GILs are integrated.

DE 199 37 661 A1 discloses a circuit arrangement of the generic type for a three-phase transmission system in which a casing conductor is provided for each phase conductor. A capacitive reactance is connected in series with the casing conductor and is used to compensate for the series impedance of the phase conductor. Compensation such as this reduces or minimizes the wattless component in the transmission system.

Furthermore, DE 199 37 661 A1 proposes that a plurality of capacitors be connected or disconnected as a function of the load on the transmission system. This circuit arrangement has the disadvantage that the impedance can only be reduced for power-factor correction.

BRIEF SUMMARY OF THE INVENTION

The invention is therefore based on the object of designing an electrical power transmission device of the type mentioned initially which can be flexibly matched to different requirements for power transmission.

According to the invention, this object is achieved in that the electronic assembly is also designed to increase the transmission impedance.

The transmission response of the entire arrangement can be influenced by increasing the transmission impedance. This is advantageous when, for example, an electrical power transmission device is used in order to connect different high-voltage grid systems to one another. When different grid systems are connected in this way, it is possible for only a low transmission power to be required at certain times. In a situation such as this, it must be possible to increase the line impedance of the electrical power transmission device. An electronic assembly which is also designed to increase the transmission impedance allows the transmission impedance of the electrical power transmission device to be changed and controlled as a function of such changing transmission requirements. Furthermore, an arrangement such as this results in considerably better damping of oscillations that occur in the grid system. By way of example, oscillations such as these may occur in an interconnected grid system in the event of defects in power generation installations connected to the interconnected grid system, and lead to fluctuations in the transmitted load flow. Oscillations such as these can be effectively damped by the arrangement according to the invention thus considerably improving the transmission response overall.

In one advantageous development, the electronic assembly is galvanically connected to the casing circuit. A galvanic connection allows the transmission impedance to be controlled in a simple manner.

In one expedient development, the electronic assembly comprises the reactance. An arrangement such as this has the advantage that there is no need to arrange any other reactance in the casing circuit, since the transmission impedance of the electrical power transmission device can be controlled by means of the electronic assembly interacting with the reactance. A coil or a capacitor, or a combination of coils and capacitors, may be provided as the reactance.

In another embodiment, the electronic assembly is inductively coupled to the casing circuit. Inductive coupling of the electronic assembly to the casing conductor allows precise control with fine increments.

In one expedient development, the electronic assembly is galvanically connected to a primary winding on a first transformer, and a secondary winding on the first transformer is galvanically connected to the casing circuit. An embodiment such as this is used for an active voltage input. Depending on the configuration of the transformer, with or without a phase shift, an AC voltage can be fed into the casing circuit via the first transformer. An input such as this allows the impedance of the casing circuit, and therefore the transmission impedance of the electrical power transmission device, to be controlled precisely and with fine increments.

In one preferred embodiment, a primary of a second transformer is connected to the phase conductor, and the secondary of the second transformer is connected to the electronic assembly. The connection of the second transformer to the phase conductor allows an AC voltage to be tapped off directly from the phase conductor, and to be fed into the casing circuit via the electronic assembly. The AC voltage which is fed into the casing circuit likewise influences the transmission impedance of the electrical power transmission device, via the inductive coupling. Furthermore, the AC voltage which is tapped off from the phase conductor can advantageously be used to control power semiconductors.

In one preferred embodiment, the electronic assembly comprises mains-commutated power semiconductors. The use of mains-commutated power semiconductors offers a cost-effective capability to control the casing current and the transmission impedance of the electrical power transmission device.

In one particularly preferred embodiment, the electronic assembly has a capacitor arranged in parallel with a parallel branch, with the parallel branch comprising a series circuit formed from two thyristors, connected back-to-back in parallel, and a coil. An arrangement such as this is also referred to as a "thyristor controlled series capacitor" (TCSC). A TCSC is cost-effective and operates with low losses. The TCSC allows the impedance to be set both in the inductive range and in the capacitive range, as a function of the phase angle which is used to drive the thyristors. In consequence, the control of the transmission impedance is therefore highly flexible, particularly when the transmission impedance must be increased in order to control the load flow.

In a further refinement, a switching element is connected in parallel with the parallel branch. Switching elements, for example vacuum interrupters or other power switches, are used to protect costly power semiconductors.

In one expedient development, the electronic assembly may be connected in series with a controllable coil. A controllable coil provides further possible ways to influence the transmission impedance of the electrical power transmission device.

In one preferred embodiment, the electronic assembly has a back-to-back link. The back-to-back link allows an expediently generated AC voltage to be fed into the casing circuit. This results in the current in the casing circuit and therefore the transmission impedance of the electrical power transmission device being controlled precisely and with fine increments.

In a further refinement, the back-to-back link comprises converters with self-commutated power semiconductors. The use of self-commutated power semiconductors allows the power semiconductors to be switched on and off in the MHz range. This makes it possible to produce AC voltages with any desired phase angle and amplitude thus allowing the casing current to be controlled, and therefore the transmission impedance of the electrical power distribution system to be controlled quickly and with fine increments when the transmission requirements change, for example when oscillations occur in the grid system.

The back-to-back link advantageously comprises a first converter, which is connected on the AC voltage side to the first transformer, and a second converter, which is connected on the DC voltage side to the first converter and on the AC voltage side to the second transformer. In an embodiment such as this, the second converter may be designed using low-loss, mains-commutated power semiconductors such as thyristors. This is advantageous since this reduces the system costs.

Furthermore, the electronic assembly may have a converter assembly with a converter and a capacitor, which is connected on the DC voltage side to the converter. The capacitor in a converter assembly such as this acts as an energy store for the self-commutated power semiconductors in the converter. When using a converter assembly such as this, a converter can therefore produce an AC voltage from the energy stored in the capacitor, and can feed this into the casing circuit. This allows the current in the casing circuit and, as a consequence of this, the transmission impedance of the electrical power transmission device to be influenced over a wide range, in such a way that the transmission impedance can be controlled flexibly, depending on the respective requirements. The use of assemblies such as this has been found to be particularly advantageous in particular to damp the oscillations that have been mentioned in the grid system, since these assemblies allow rapid control.

In a further refinement of the invention, a first electronic assembly is provided at the first end of the casing conductor, and a second electronic assembly is provided at the second end of the casing conductor.

In one preferred embodiment, the electrical power transmission device is a gas-insulated line. In a gas-insulated line, the phase conductors are coaxially surrounded by the gas-tight casing conductors. This ensures particularly good inductive coupling between the casing conductor and the phase conductor, such that the transmission impedance can be controlled easily by the arrangement of electronic assemblies in the casing circuit, according to the invention.

In one refinement, which differs from this, the electrical power transmission device is a cable. In a cable such as this, the phase conductor is surrounded by a pressure-resistant tube which is used as the casing conductor. The inductive coupling between the phase conductor and the tubular casing conductor can be used for the arrangement according to the invention of electronic assemblies in the casing circuit in order to control the transmission impedance.

The invention will be described in the following text using exemplary embodiments and with reference to the figures of the drawing, in which:

DESCRIPTION OF THE INVENTION

Figure 1:
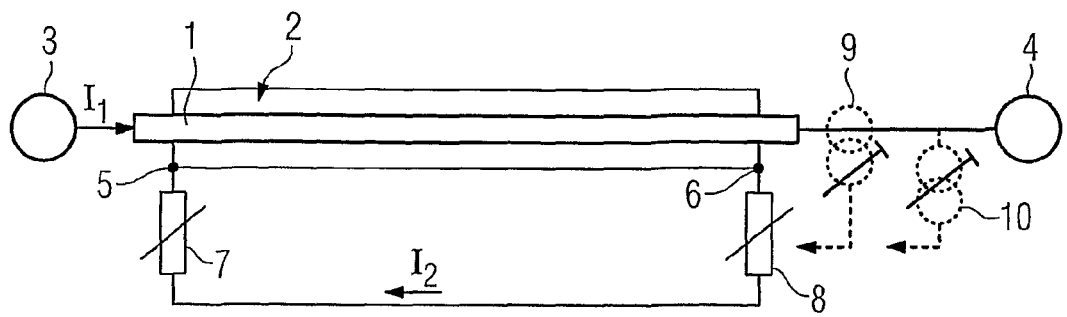
FIG. 1 shows a schematic illustration of a gas-insulated line with electronic assemblies in the casing circuit.

FIG. 1 shows a schematic view of a gas-insulated line. The gas-insulated line has a tubular phase conductor 1 and a casing conductor 2 which surrounds the phase conductor 1 in a gas-tight manner. On the input side, the phase conductor 1 is connected to an electrical power grid system 3. On the output side, the phase conductor 1 is connected to a load 4. Power can flow from the electrical power grid system 3 to the load 4 via the phase conductor 1. The ends 5 and 6 of the casing conductor 2 are connected via reactances 7 and 8 to form a closed casing circuit. The reactances 7 and 8 may be capacitors, coils or electronic assemblies. FIG. 1 shows two transformers 9 and 10, by dashed-dotted lines, which can each optionally be provided in the arrangement.

An alternating current $I_1$ flowing in the phase conductor 1 induces a voltage in the casing circuit, resulting in a so-called called casing current $I_2$. The reactance 8 is an electronic assembly which has a variable impedance. This electronic assembly 8 can be used to vary the magnitude and phase angle of the casing current $I_2$. This in turn influences the impedance for the conductor current $I_1$, as a result of induction. A change in the impedance of the electronic assembly 8 can therefore be used to control the transmission response of the phase conductor 1 and therefore to vary the transmission impedance of the gas-insulated line. An AC voltage is also injected into the casing circuit from the main conductor when using one of the transformers 9 or 10. The primary of the transformers 9 or 10 is connected either galvanically or inductively to the phase conductor 1. A secondary of the respectively used transformer 9 or 10 is galvanically or inductively coupled to the electronic assembly 8, via which the voltage produced in the transformer 9, 10 is fed into the casing circuit. The transformers are used to tap off a voltage from the phase conductor, and this voltage is fed into the casing circuit via the electronic assembly. Feeding in this voltage results in a change in the casing current $I_2$ and, via the inductive coupling between the casing circuit and the phase conductor, leads to the transmission impedance of the gas-insulated line being influenced such that the transmission impedance of the electrical power transmission device can be varied as required.

Figure 2:
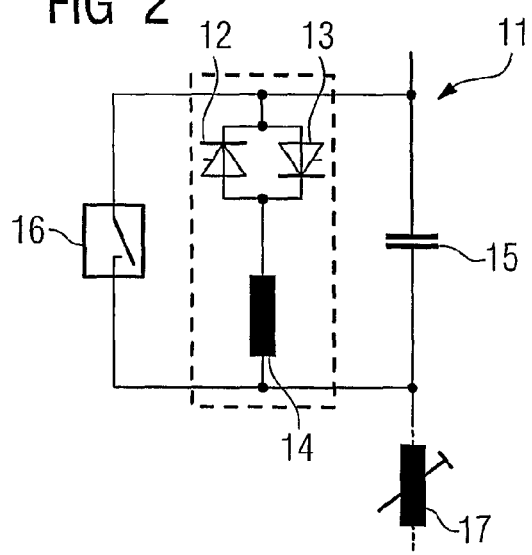
FIG. 2 shows an electronic assembly for use in the casing circuit of a gas-insulated line.

FIG. 2 shows a schematic circuit arrangement of an electronic assembly 11 which can be used as the reactance 8 in FIG. 1. The electronic assembly 11 is in this case a so-called mains-commutated thyristor controlled series capacitor (TCSC). In the TCSC 11, thyristors 12, 13 which can be switched in opposite senses are connected in series with a first coil 14, forming a parallel branch, and are connected in parallel with a capacitor 15 and a mechanical switching element 16. A further controllable coil 17 can optionally be provided. The arrangement from FIG. 2 is provided as the electronic assembly 8 in FIG. 1.

Figure 3:
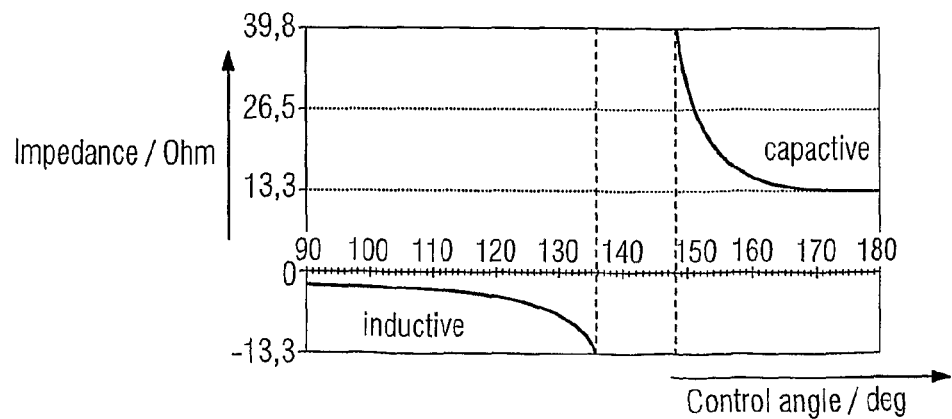
FIG. 3 shows the impedance response of the electronic assembly shown in FIG. 2.

FIG. 3 shows the impedance response of the electronic assembly 11 in FIG. 2 as a function of the phase angle, which governs the time with respect to the AC voltage on the phase conductor at which the thyristors are triggered. When the thyristors 12, 13 are driven with a phase angle of between 90 and about 135°, the electronic assembly 11 has an inductive impedance response. When driven at an angle of between about 145 and 180°, then the electronic assembly 11 has a capacitive response. The use of an electronic assembly 11 such as this in the casing circuit therefore allows the impedance to be controlled from the inductive range to the capacitive range as a function of the phase angle.

Figure 4:
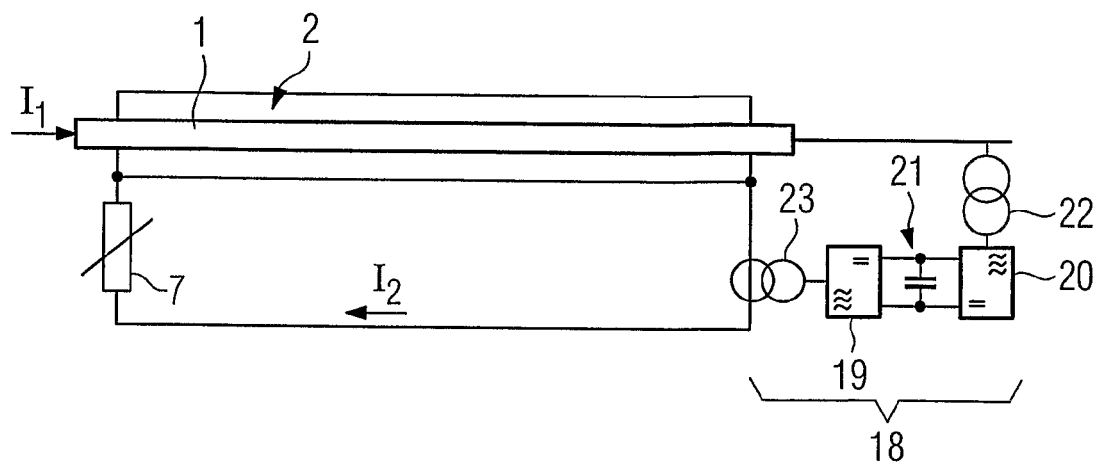
FIG. 4 shows a gas-insulated line with a different electronic assembly in the casing circuit.

FIG. 4 shows a further exemplary embodiment of a power transmission device according to the invention. The reactance 8 from FIG. 1 is in this case formed by a back-to-back link 18, which is known per se. The back-to-back link 18 has two converters 19 and 20, which are connected to one another on the DC voltage side via a line arrangement 21. The AC voltage side of the respective converter 19 or 20 is connected via respective transformers 22 and 23 to the phase conductor 1 or to the casing circuit. The phase conductor 1 induces an AC voltage via the transformer 22, and this voltage is converted to a DC voltage by the first converter 20. The DC voltage that is produced is applied to the second converter 19, which converts the DC voltage to an AC voltage with the desired magnitude and at the desired phase angle with respect to the AC voltage in the casing circuit. Finally, the AC voltage is fed into the casing circuit via the transformer 23.

Figure 5:
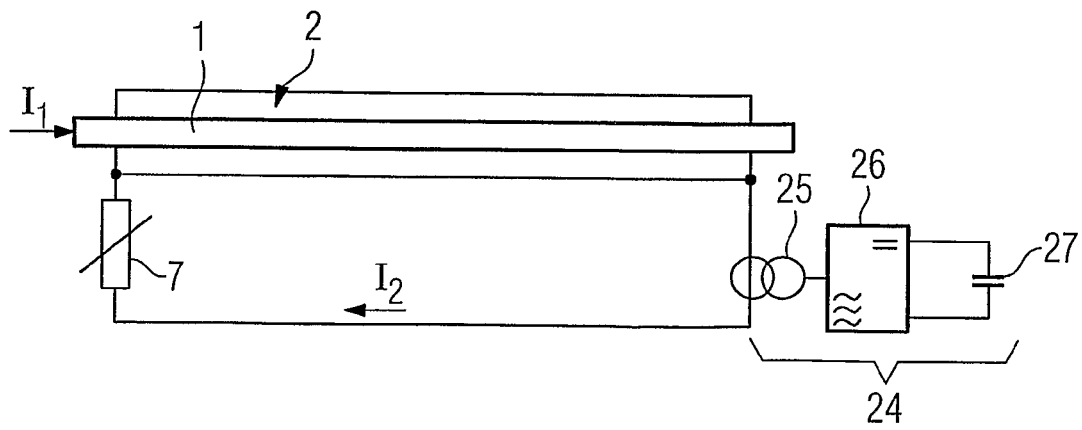
FIG. 5 shows a gas-insulated line with a further electronic assembly in the casing circuit.

FIG. 5 shows a further embodiment of a gas-insulated line in which the reactance 8 from FIG. 1 is formed by a converter assembly 24 which is inductively connected to the casing conductor via a transformer 25. The converter assembly 24 has a converter 26 which has a capacitor 27, in order to feed power, on its DC voltage side. The converter assembly 24 is used to control the casing current $I_2$ in the casing circuit, and therefore to influence the transmission impedance of the gas-insulated line. The converter assembly 24 in this embodiment is either a so-called static Var compensator, as is known per se, or a so-called static synchronous compensator, which is likewise known per se.

LIST OF REFERENCE SYMBOLS

1 Phase conductor
2 Casing conductor
3 Electrical power grid system
4 Load
5, 6 Ends
7, 8 Reactances
9, 10 Transformers
11 TCSC
12, 13 Thyristors
14 Coil
15 Capacitor
16 Switching element
17 Coil
18 Back-to-back link
19, 20 Converter stations
21 Line arrangement
22, 23 Transformers
24 Converter assembly
25 Transformer
26 Converter
27 Capacitor

The invention claimed is:

1. An electrical power transmission device, comprising:
phase conductors for carrying alternating current and each have a transmission impedance;
a reactance;
casing conductors inductively coupled to said phase conductors and each having a first end and a second end, each of said first and second ends together with said reactance forming a casing circuit having a given impedance; and
an electronic assembly for varying the given impedance of said casing circuit, said electronic assembly configured for increasing the transmission impedance.

2. The electrical power transmission device according to claim 1, wherein said electronic assembly contains said reactance.

3. The electrical power transmission device according to claim 1, wherein said electronic assembly is galvanically connected to said casing circuit.

4. The electrical power transmission device according to claim 1, wherein said electronic assembly is inductively coupled to said casing circuit.

5. The electrical power transmission device according to claim 4, further comprising a transformer having a primary winding and a secondary winding, said electronic assembly is galvanically connected to said primary winding of said transformer, said secondary winding of said transformer is galvanically connected to said casing circuit.

6. The electrical power transmission device according to claim 5, further comprising a further transformer having a further primary winding and a further secondary winding, said further primary winding is connected to at least one of said phase conductors, and said further secondary winding is connected to said electronic assembly.

7. The electrical power transmission device according to claim 6, wherein said electronic assembly contains mains-commutated power semiconductors.

8. The electrical power transmission device according to claim 7, wherein said electronic assembly has:
a parallel branch containing a series circuit formed from two thyristors, connected back-to-back in parallel, and a coil; and
a capacitor disposed in parallel with said parallel branch.

9. The electrical power transmission device according to claim 8, further comprising a switching element connected in parallel with said parallel branch.

10. The electrical power transmission device according to claim 8, further comprising a controllable coil connected in series with said electronic assembly.

11. The electrical power transmission device according to claim 1, wherein said electronic assembly has a back-to-back link.

12. The electrical power transmission device according to claim 11, wherein said back-to-back link has converters with self-commutated power semiconductors.

13. The electrical power transmission device according to claim 2, wherein said converters include a first converter with an AC voltage side connected to said transformer, and a second converter having a DC voltage side connected to said first converter and an AC voltage side connected to said further transformer.

14. The electrical power transmission device according to claim 1, wherein said electronic assembly includes a converter assembly having a converter with a DC voltage side and a capacitor connected to said DC voltage side of said converter.

15. The electrical power transmission device according to claim 1, wherein said electronic assembly includes a first electronic assembly disposed at said first end of said casing conductor, and a second electronic assembly disposed at said second end of said casing conductor.

16. The electrical power transmission device according to claim 1, wherein the electrical power transmission device is a gas-insulated line.

17. The electrical power transmission device according to claim 1, wherein the electrical power transmission device is a cable.

18. The electrical power transmission device according to claim 1, wherein each one of said casing conductors surrounds a respective one of said phase conductors in a gas-tight manner.

19. The electrical power transmission device according to claim 1, wherein said phase conductors and said casing conductors are constructed to transmit power from an electrical power grid system.

* * * * *